(12) United States Patent
Takahashi et al.

(10) Patent No.: US 7,540,642 B2
(45) Date of Patent: Jun. 2, 2009

(54) SIDE TURN LAMP ON A VEHICLE DOOR MIRROR

(75) Inventors: Yoshihiro Takahashi, Isesaki (JP); Yosuke Fukasawa, Ota (JP)

(73) Assignee: Mitsuba Corporation, Kiryu-shi (JP)

( * ) Notice: Subject to any disclaimer, the term of this patent is extended or adjusted under 35 U.S.C. 154(b) by 168 days.

(21) Appl. No.: 11/723,301

(22) Filed: Mar. 19, 2007

(65) Prior Publication Data
US 2007/0223241 A1 Sep. 27, 2007

(30) Foreign Application Priority Data
Mar. 22, 2006 (JP) ............................. 2006-078231

(51) Int. Cl.
*B60Q 1/26* (2006.01)
(52) U.S. Cl. .................................... 362/494
(58) Field of Classification Search ............... 362/494, 362/540–542
See application file for complete search history.

(56) References Cited

U.S. PATENT DOCUMENTS

| 6,139,171 | A * | 10/2000 | Waldmann | 362/494 |
| 7,220,030 | B2 * | 5/2007 | Yagi | 362/494 |
| 7,278,767 | B2 * | 10/2007 | Takahashi et al. | 362/494 |
| 7,334,923 | B2 * | 2/2008 | Tanaka et al. | 362/494 |
| 2004/0190303 | A1 * | 9/2004 | Mishimagi | 362/494 |
| 2005/0254251 | A1 * | 11/2005 | Chou | 362/494 |
| 2005/0276057 | A1 * | 12/2005 | Takahashi et al. | 362/494 |
| 2006/0274543 | A1 * | 12/2006 | Takahashi et al. | 362/494 |
| 2007/0029700 | A1 | 2/2007 | Ishizawa et al. | |
| 2008/0259624 | A1 * | 10/2008 | Yajima et al. | 362/494 |

FOREIGN PATENT DOCUMENTS

| JP | A 2002-79878 | 3/2002 |
| JP | B2 3677033 | 5/2005 |
| JP | B2 3688289 | 6/2005 |

* cited by examiner

*Primary Examiner*—Stephen F Husar
*Assistant Examiner*—James W Cranson
(74) *Attorney, Agent, or Firm*—Oliff & Berridge, PLC

(57) ABSTRACT

A vehicle lamp includes a lens portion; and a base housing incorporated with a light source portion, the base housing integrated with the lens portion in a butting condition. The light source portion includes first and second light sources, a substrate, a first light source terminal plate and a second light source terminal plate implanted in the substrate so as to create a gap from each other, and an electric or electronic component that turns on the first and second light sources. A front-end part of at least one of the light source terminal plates is bent toward the other light source terminal plate so as to differentiate the first and second light sources in an irradiating direction.

22 Claims, 13 Drawing Sheets

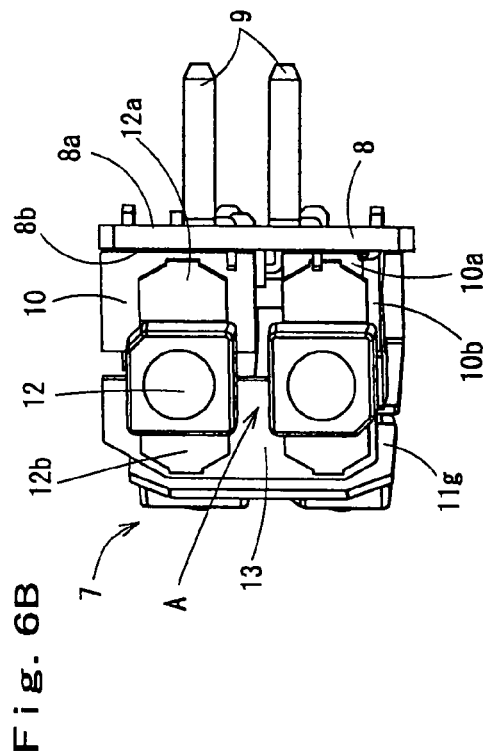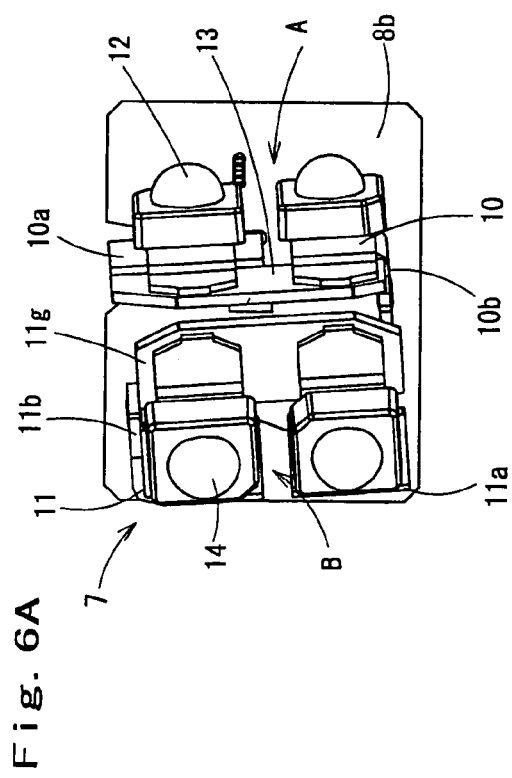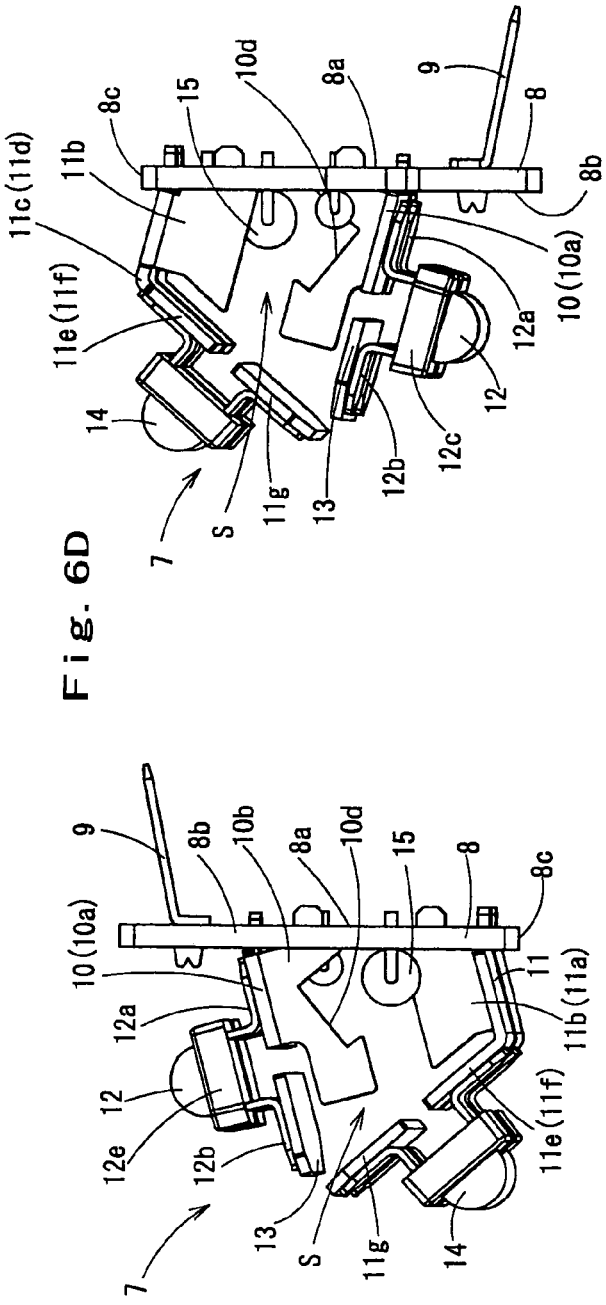

SIDE TURN LAMP ON A VEHICLE DOOR MIRROR

CROSS-REFERENCE TO RELATED APPLICATION

This application claims priority from Japanese Patent Application No. 2006-078231, filed Mar. 22, 2006, the entire disclosure of which is incorporated herein by reference in its entirety.

BACKGROUND

The present invention relates to a vehicle lamp.

There has recently been provided a side turn lamp mounted on a door mirror of a vehicle. Electronic components, such as light-emitting diodes (LEDs), are used as light sources because the light sources themselves are excellent in directionality. The light sources are sometimes mounted so as to irradiate in different directions, (see, for example, Japanese Published Unexamined Patent Application No. 2002-79878).

SUMMARY

There exists light source units that have been formed by incorporating the light sources, which are directed toward respective directions, in respective corresponding substrates together with necessary electrical (electronic) components such as resistors. As a result, the light source units increase in size to hinder compactness. Moreover, the respective light source units have been mounted on respective mounting spaces secured in a base housing forming the side turn lamp. As a result, not only is the number of components increased to make mounting work troublesome and complicated, but in order to firmly mount the light source units, it becomes necessary to mount the light source units via mounting plates provided in a standing condition from a base housing. The structure is thus further complicated. The present invention thus solves the above problems, and achieves other various advantages.

The disclosure addresses an exemplary aspect in which a vehicle lamp includes a lens portion and a base housing incorporated with a light source portion, the base housing integrated with the lens portion in a butting condition. The light source portion includes first and second light sources, a substrate, a first light source terminal plate and a second light source terminal plate implanted in the substrate so as to create a gap from each other, and an electric or electronic component that turns on the first and second light sources. A front-end part of at least one of the light source terminal plates is bent toward the other light source terminal plate so as to differentiate the first and second light sources in an irradiating direction.

In another exemplary aspect, a space enclosed by the substrate and the first and second light source terminal plates is formed by bending the front-end part of the at least one light source terminal plate toward the other light source terminal plate, and the electric or electronic component is disposed in the space.

In another exemplary aspect, the substrate is provided with a power terminal that is disposed on a side opposite a side to implant the light source terminal plates and protrudes outside through the base housing.

In another exemplary aspect, the vehicle lamp is a side turn lamp provided on a door mirror of a vehicle.

According to various exemplary aspects of the disclosure, the light sources can be made to irradiate in different directions by bending at least one of the terminal plates implanted in the single substrate toward the other terminal plate, and thus a structural simplification and a reduction in the number of components can be realized.

According to various exemplary aspects of the disclosure, an electric or electronic component can be disposed by making use of the space formed by the substrate and the first and second terminal plates in an enclosed manner, and thus further miniaturization becomes possible.

According to various exemplary aspects of the disclosure, the power terminal can also be provided on the substrate, and thus using all lead wires for the lamp is unnecessary.

According to various exemplary aspects of the disclosure, a side turn lamp provided on a door mirror can be easily manufactured.

BRIEF DESCRIPTION OF THE DRAWINGS

Various embodiments of the invention will be described with reference to the drawings, wherein:

FIG. 6A is a plan view of a light source portion, FIG. 6B is a front view of the light source portion, FIG. 6C is a one side view of the light source portion, and FIG. 6D is the other side view of the light source portion;

DETAILED DESCRIPTION OF EMBODIMENTS

Figure 1A:
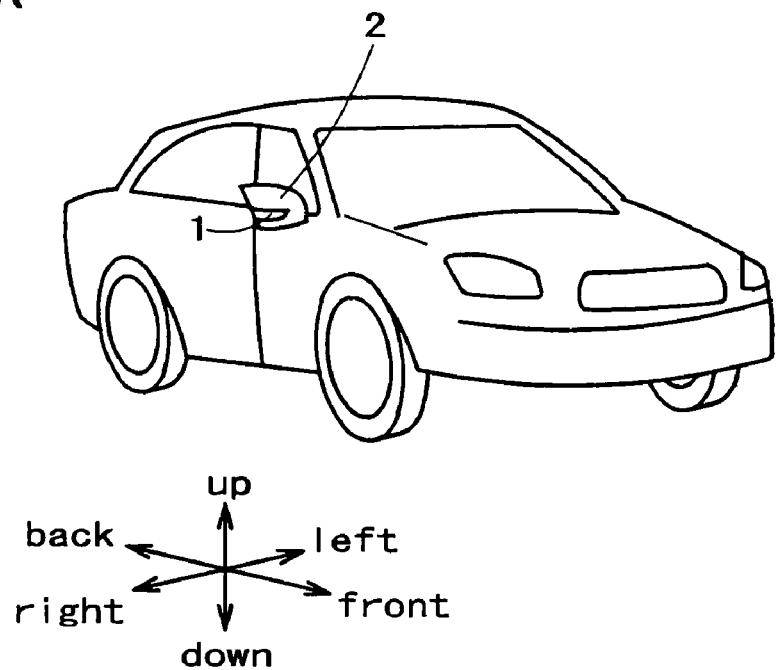
FIG. 1A is a perspective view of a vehicle.

Next, embodiments of the present invention will be described based on FIGS. 1A-13. In the drawings, reference numeral 1 denotes a side turn lamp provided on a door mirror 2 (FIGS. 1A and 1B), and the side turn lamp 1 includes an outside lens portion 3 (FIGS. 2A-2C) formed of a translucent resin, an inside base housing (base portion, base member) 4 fixed to and supported on the door mirror 2 while being fixedly fitted with the lens portion 3, and an inner housing (inner portion, inner member) 6 incorporated in the base housing 4 in a condition located between the base housing 4 and the lens portion 3. The inner housing 6 has a reflecting surface 5 formed at an outer lateral face thereof. That serves as a reflector (reflecting member) of the side turn lamp 1. The side turn lamp 1 also includes a light source portion 7 mounted on the inner housing 6.

Figure 1B:
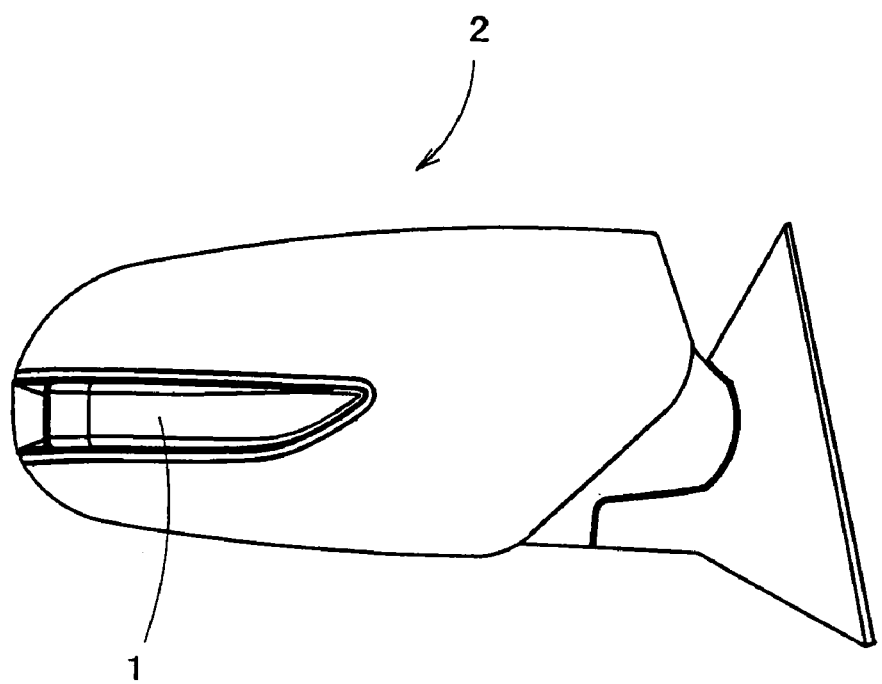
FIG. 1B is a front view of a door mirror.
Figure 2A:
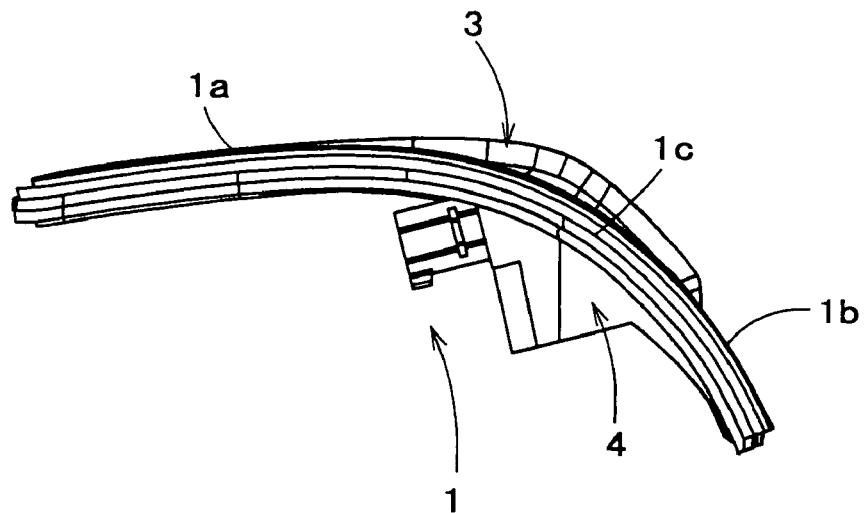
FIG. 2A is a plan view of a side turn lamp.
Figure 2B:
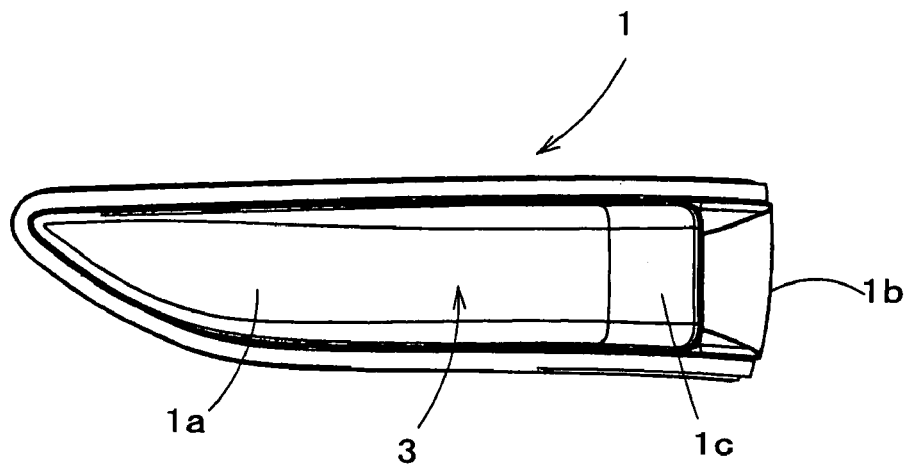
FIG. 2B is a front view of the side turn lamp.
Figure 2C:
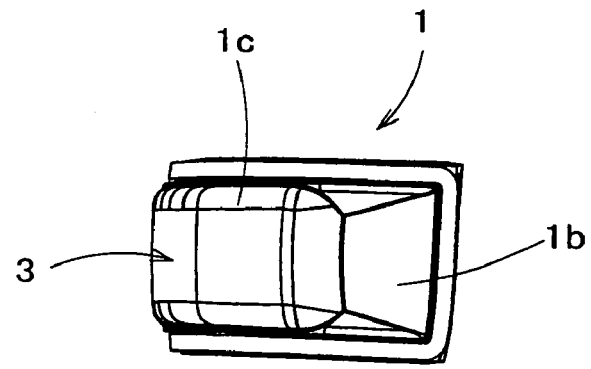
FIG. 2C is a side view of the side turn lamp.
Figure 3:
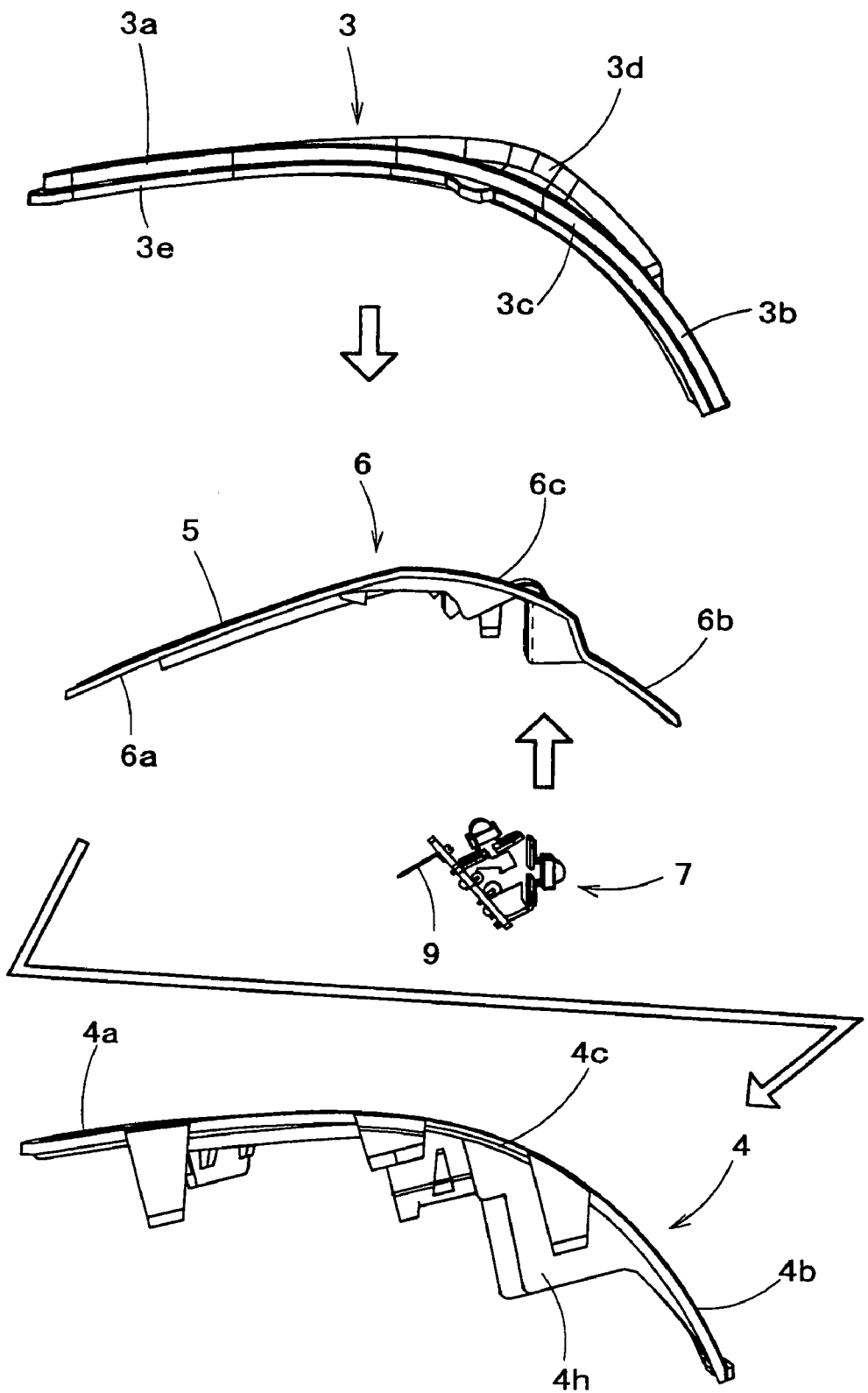
FIG. 3 is an exploded plan view of a side turn lamp.
Figure 4A:
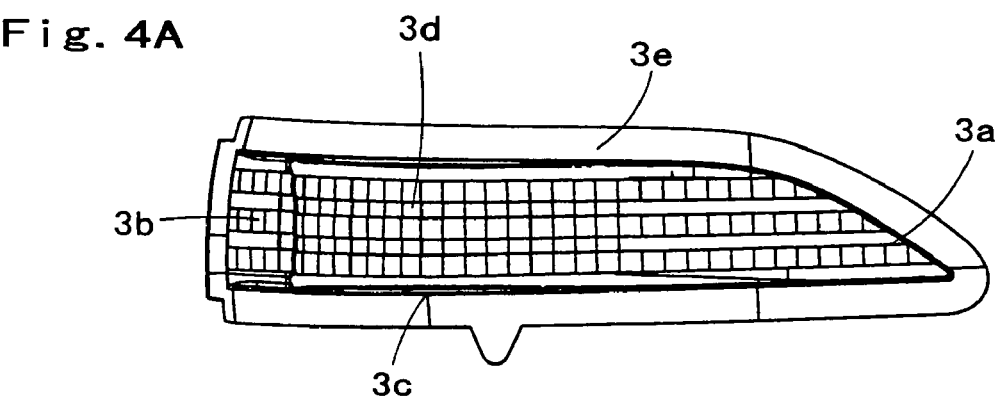
FIG. 4A is a back view of a lens portion.
Figure 4B:
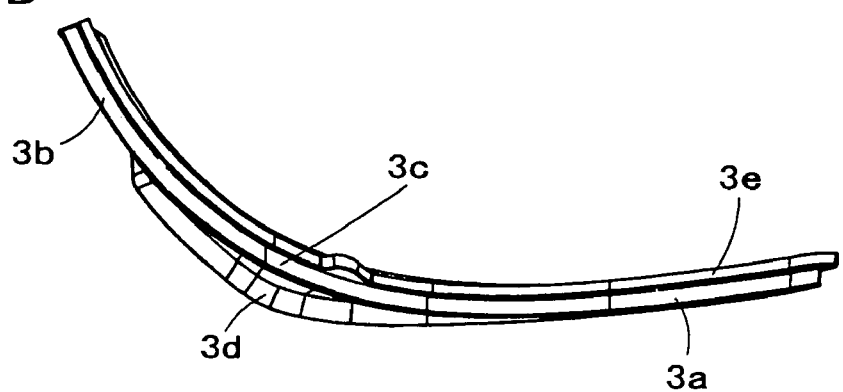
FIG. 4B is a plan view of the lens portion.
Figure 4C:
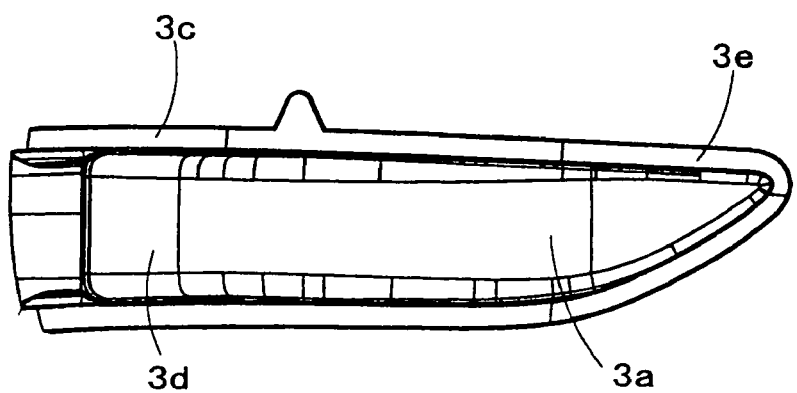
FIG. 4C is a front view of the lens portion.
Figure 4D:
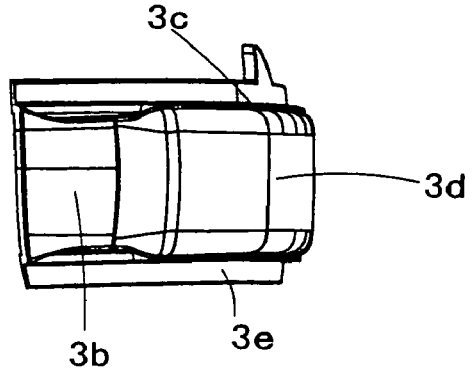
FIG. 4D is a side view of the lens portion.
Figure 5A:
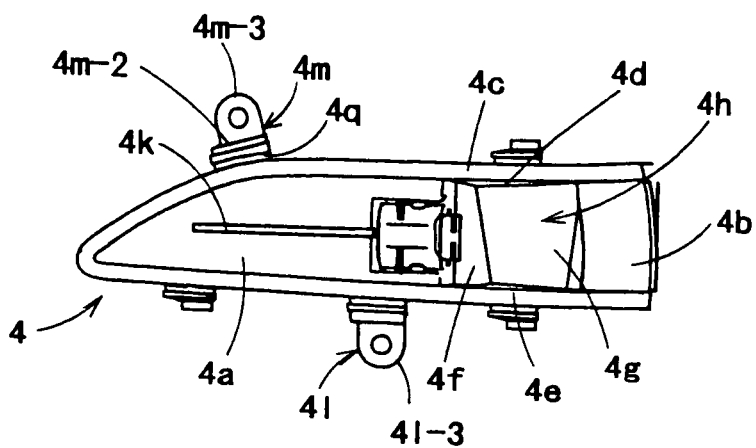
FIG. 5A is a front view of a base housing.
Figure 5B:
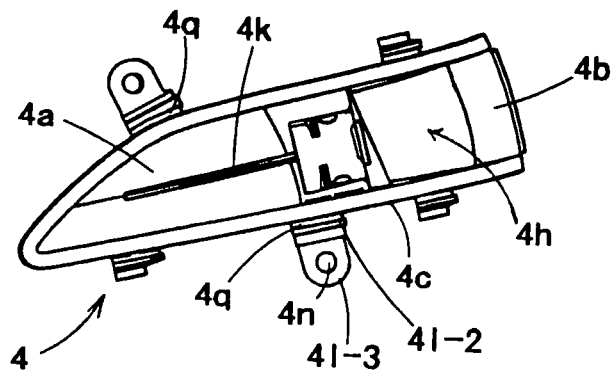
FIG. 5B is a perspective view.
Figure 5C:
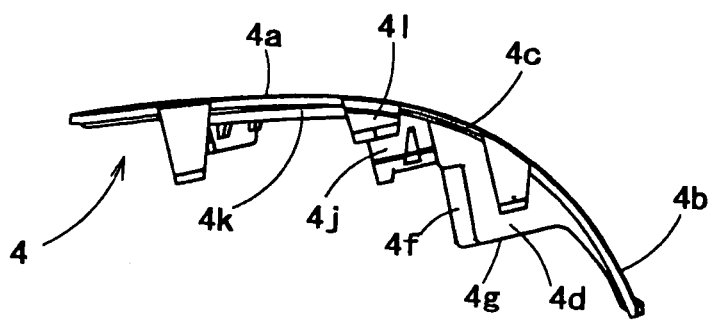
FIG. 5C is a plan view of the base housing.
Figure 5D:
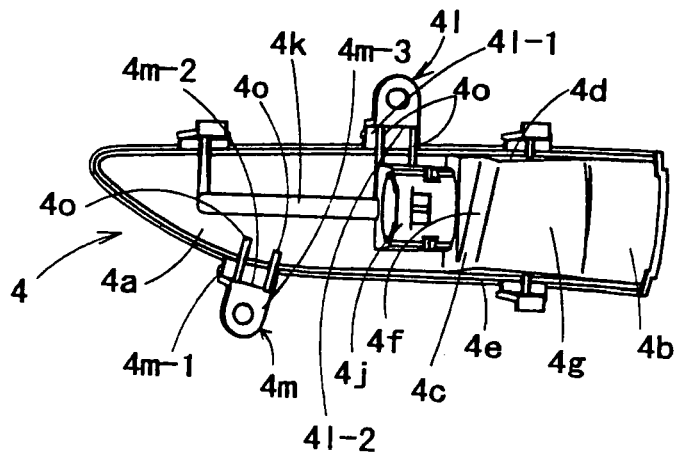
FIG. 5D is a back view of the base housing.
Figure 7A:
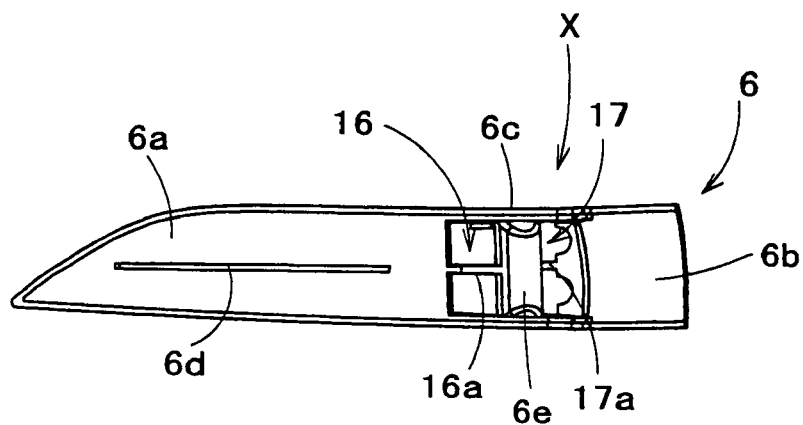
FIG. 7A is a front view of an inner housing.
Figure 7B:
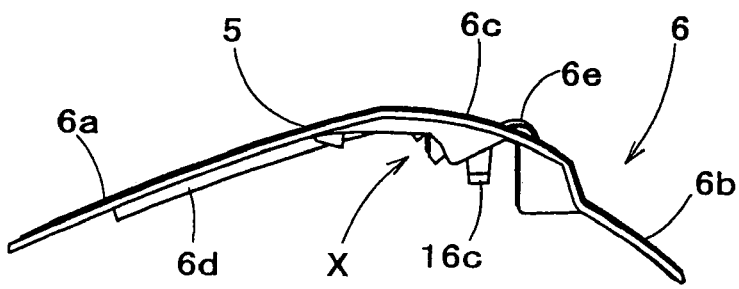
FIG. 7B is a plan view of the inner housing.
Figure 7C:
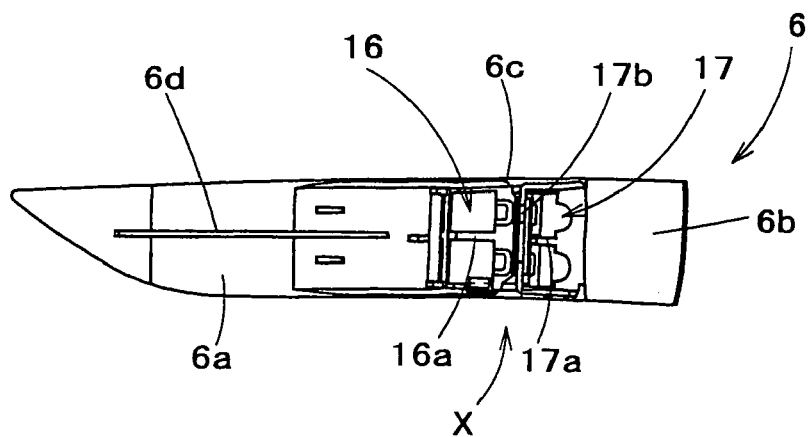
FIG. 7C is a back view of the inner housing.
Figure 7D:
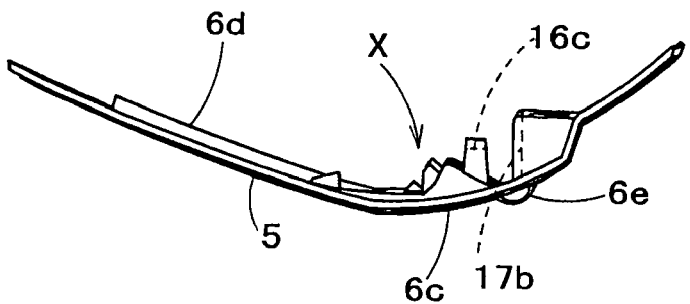
FIG. 7D is a bottom view of the inner housing.
Figure 8A:
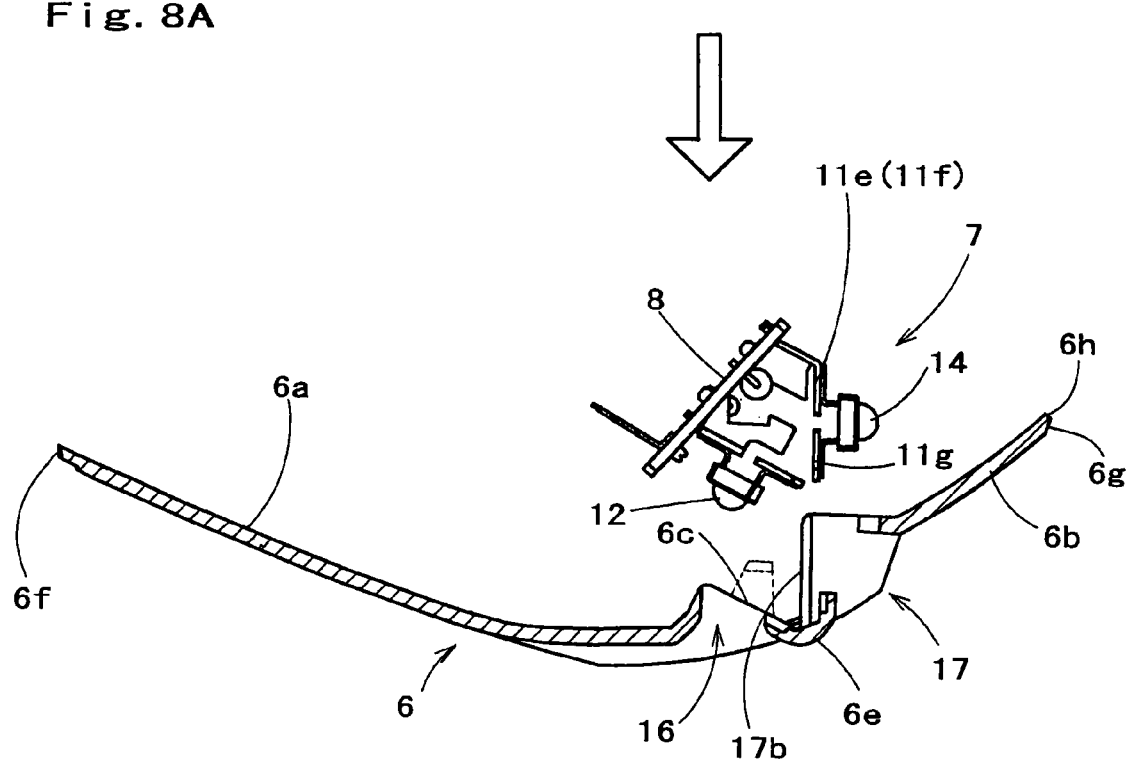
FIG. 8A is a sectional view showing a condition before the light source portion is incorporated in the inner housing.
Figure 8B:
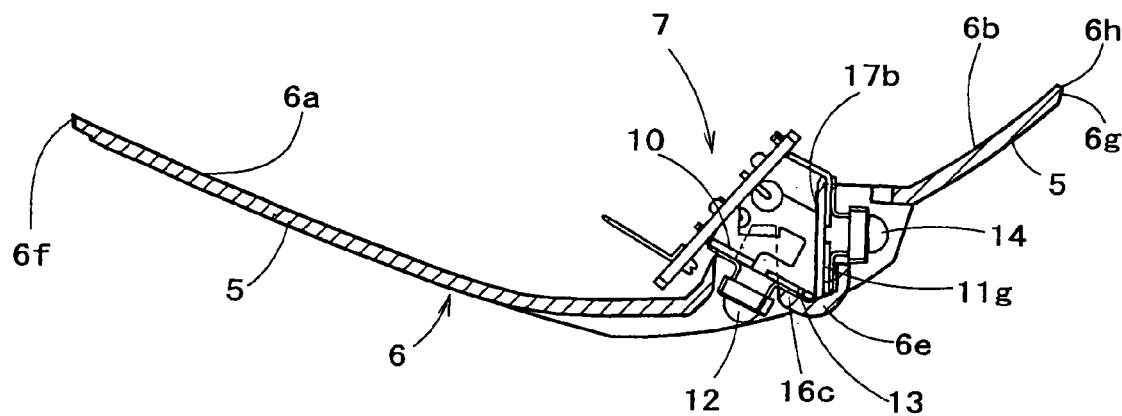
FIG. 8B is a sectional view showing a condition where the light source portion has been incorporated in the inner housing.
Figures 9A, 9B:
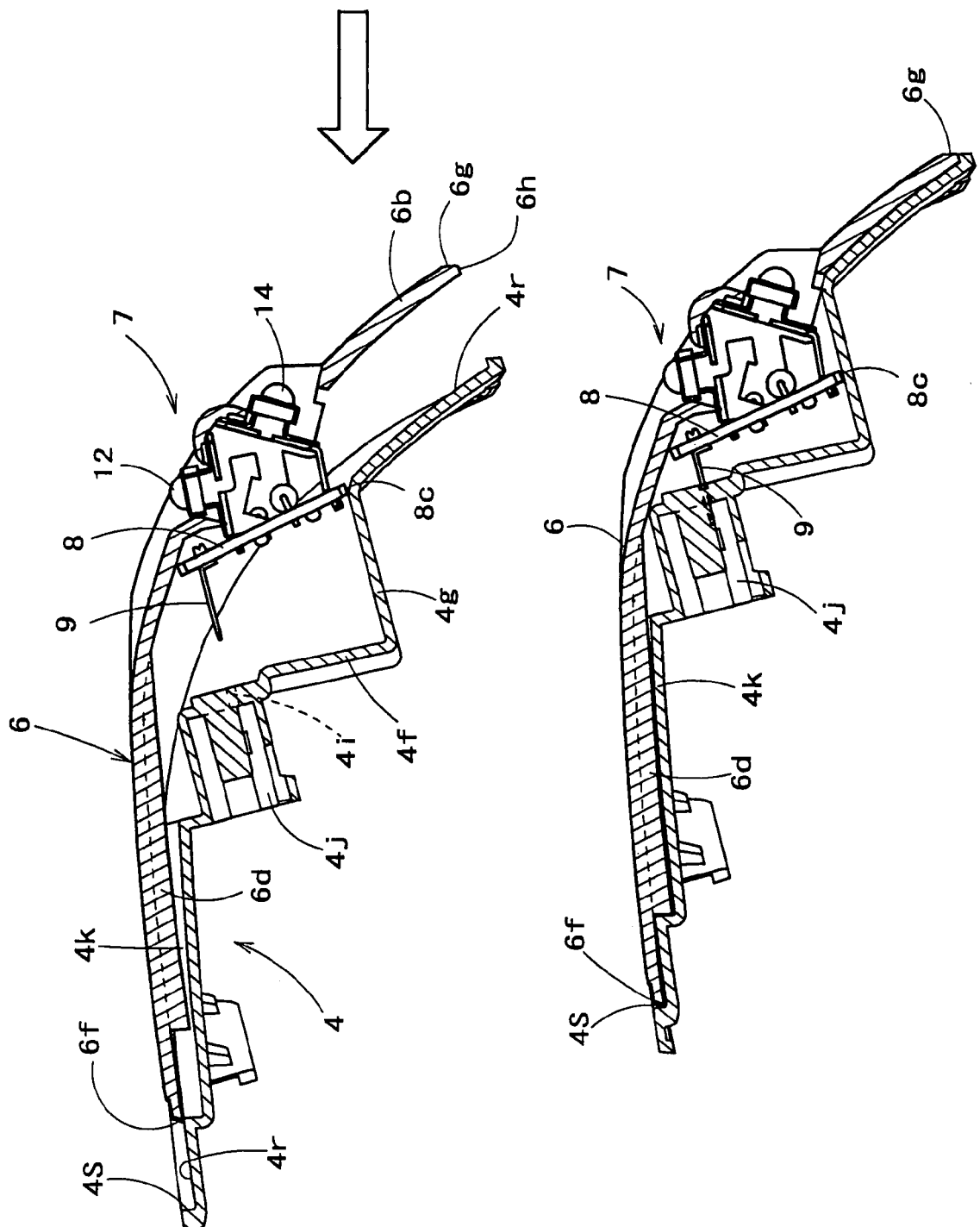
FIG. 9A is a sectional view showing a condition before the inner housing incorporated with the light source portion is incorporated in the base housing.
FIG. 9B is a sectional view showing a condition where the inner housing incorporated with the light source portion has been incorporated in the base housing.
Figure 10A:
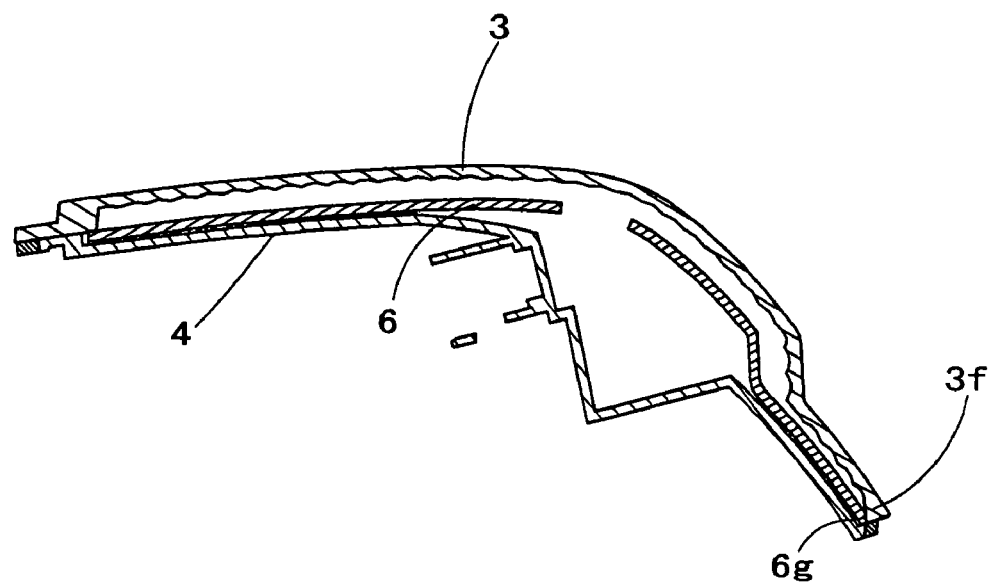
FIG. 10A is a longitudinal end view showing an incorporated condition of the lens portion, the inner housing, and the base housing.
Figure 10B:
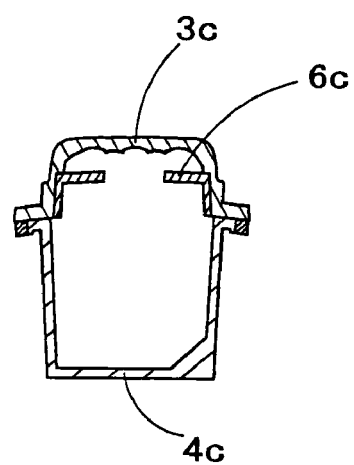
FIG. 10B is a cross end view showing an incorporated condition of the lens portion, the inner housing, and the base housing.
Figure 11A:
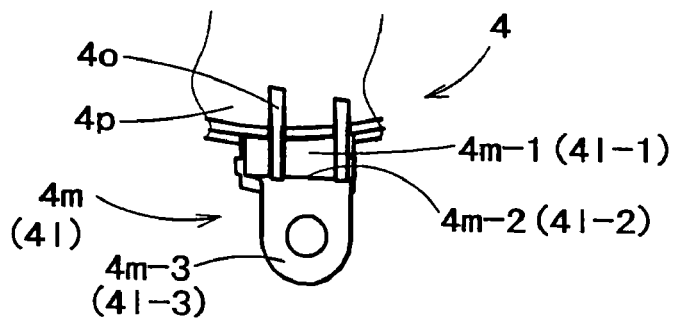
FIG. 11A is a front view of a lower mounting piece part of the base housing.
Figure 11B:
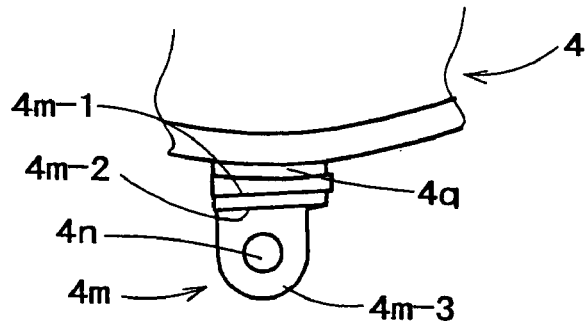
FIG. 11B is a back view of a lower mounting piece part of the base housing.
Figure 11C:
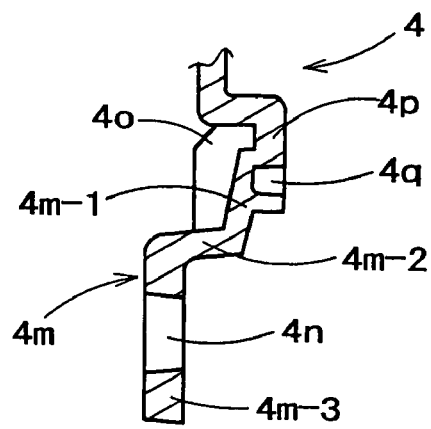
FIG. 11C is a sectional view of a lower mounting piece part of the base housing.
Figure 11D:
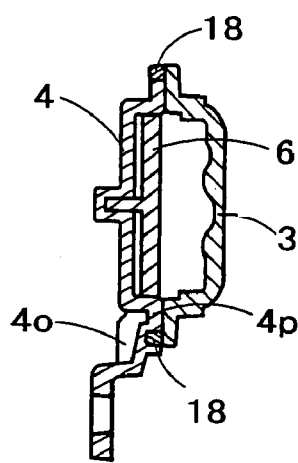
FIG. 11D is an end view of a lower mounting piece part of the side turn lamp.

Because the side turn lamp 1 is mounted in a condition extending from a front face of the door mirror 2 to an outer lateral face in the left and right direction, the side turn lamp 1 is constructed so that a front face portion face 1a and an outer lateral face portion 1b are formed in a series form via an arc-shaped portion (curved portion) 1c. The lens portion 3, the base housing 4, and the inner housing 6 are also formed in a form corresponding thereto. Hereinafter, a configuration including these forms will be described in detail. In this connection, front and back, left and right, and up and down directions described in the present embodiment are based on the front and back, left and right, and up and down directions of a vehicle as illustrated in FIG. 1A, and as a matter of course, the present invention is not always limited thereto.

The lens portion 3 is molded so that a front face portion 3a and an outer lateral face portion 3b are made in a series form by an arc-shaped portion (curved portion) 3c. On the arc-shaped portion 3c, a lens portion-side light source housing portion 3d for housing the light source portion 7 with a gap is formed in a manner bulging out toward the outside of the mirror (front of the vehicle). A flange portion 3e for fixation with the base housing 4 is formed on the rim of the lens portion 3.

On the other hand, the base housing 4 is formed in a series form by an arc-shaped portion 4c in a condition where a front face portion 4a and an outer lateral face portion 4b are also made in a gentle arc shape. From the arc-shaped portion 4c to the outer lateral face portion 4b, a base housing-side light source housing portion 4h is formed in a manner bulging out toward the inside of the mirror (back of the vehicle) in order to house the light source portion 7. The housing portion 4h has a triangular box shape formed by right triangular-shaped upper and lower face portions 4d, 4e (FIGS. 5A-5D), a quadrangular-shaped inner lateral face portion 4f, and a quadrangular-shaped back lateral face portion 4g. Moreover, a front-end part of the inner lateral face portion 4f is sunken into the front face portion 4a side with a slightly stepped form, at which a through-hole 4i (FIG. 9A) is formed for inserting and passing through a power terminal 9 (to be described later) provided in the light source portion 7 (described later) inward in the left and right direction of the vehicle. A power plug-in portion (connector portion) 4j for inserting an unillustrated power socket is formed at the passing-through part of the base housing 4. Furthermore, on the front face portion 4a, a concave groove 4k, which is sunken in at a front face side, is formed and the concave groove 4k is formed in a long groove facing in a direction to insert the power terminal 9 in the through-hole 4i.

In addition, on the base housing 4, upper and lower mounting pieces 4l, 4m for mounting and fixing the side turn lamp 1 to the door mirror 2 are provided in a protruding condition from upper and lower edges of the front face portion 4a toward the upper and lower directions, respectively. As for the upper and lower mounting pieces 4l and 4m, upper and lower ends (front ends) of base portions 4l-1 and 4m-1 protruded outward in the upper and lower direction in a condition built up on the back face of the front face portion 4a are bent in a stepped form backward (a direction opposite the side where the lens portion 3 exists), wherein stepped portions 4l-2, 4m-2 are formed.

Furthermore, from back ends (front ends) of the stepped portion 4l-2 and 4m-2, front-end portions 4l-3 and 4m-3 are formed by bending outward in the upper and lower direction, whereby the upper and lower mounting pieces 4l, 4m are formed in a manner retracting in a stepped form toward the back side (side opposite the lens portion 3), and mounting holes 4n for unillustrated mounting bolts (screws) are formed at the front-end portions 4l-3, 4m-3 thereof. Furthermore, on the back faces of the mounting piece base portions 4l-1, 4m-1 and the lower faces of the stepped portions 4l-2, 4m-2 (both are surfaces at the side opposite the side where the lens portion 3 exists), ribs 4o provided in a protruding condition backward, upward, and downward are provided in an extended condition from the back face of the front face portion 4a and are integrated therewith, whereby the upper and lower mounting pieces 4l, 4m are reinforced. In addition, on the front faces of the base portions 4l-1, 4m-1, flange portions 4p (FIGS. 11A-11D) are formed in a condition separated from upper and lower edges of the front face portion 4a, and filling grooves 4q for filling a resin material 18 to fix the lens portion 3 and the base housing 4 (to be described later) are formed between the flange portions 4p and upper and lower edges of the front face portion 4a.

On the other hand, the light source portion 7 (FIGS. 6A-6D) is to be incorporated in the base housing-side light source housing portion 4h in a condition incorporated in the inner housing 6 as described later. A substantially square plate-shaped substrate 8, being a component of the light source portion 7, is disposed so that an inner lateral face 8a thereof is opposed to the outer face of the inner lateral face portion 4f outside in the left and right direction. In addition, at a front-end portion of the inner lateral face 8a of the light source portion, the power terminal 9 is formed in a protruding condition inward in the left and right direction, and the substrate 8 is structured so that the power terminal 9 is guided to the through-hole 4i so as to pass therethrough when a back edge 8c is moved inward in the left and right direction in a condition making sliding contact with a front face of the base housing back lateral face portion 4g.

On the other hand, on an outer lateral face 8b of the substrate 8, two sets of each upper and lower pair of base terminal plates 10, 10a and 11, 11a juxtaposed top and bottom in a flush manner with plate faces facing front and back are provided in a protruding condition outward in the left and right direction in a condition displaced to the front and back, and of the front base portion terminal plate 10, 10a, a lower edge portion of the lower terminal plate 10a is formed by bending backward, and a latching portion 10d with the inner housing 6 side (to be described later) is formed in a notch groove form at a front edge portion of the backwardly bent plate 10b.

To the front base portion terminal plates 10, 10a, one of the terminals 12a is connected so that an upper and lower pair of front light sources (light-emitting diodes are used in the present embodiment) 12 emit light forward with a gap therebetween. These front light sources are for irradiating light forward and are therefore not legally required light sources for a side turn lamp. In addition, the other terminal 12b located outward in the left and right direction of each front light source 12 provides fitting and electrical connection of the upper and lower front light sources 12 by being connected to a front connecting terminal plate 13 disposed in a manner flush with the front base portion terminal plates 10, 10a. These front base portion terminal plates 10, 10a and the front connecting terminal plate 13 form a front terminal plate having an intersection plate face that intersects with an incorporating direction of the light source portion 7 as will be described later. Moreover, the front base portion terminal plates 10, 10a, the front light sources 12, and the front connecting terminal plate 13 are made into a rigid body by the connection (coupling). Moreover, as a result of the front upper base terminal plate 10 and the backwardly bent plate 10b caulked to the substrate 8 being fixedly fitted by soldering, against shaking in the left and right direction and in the front and back direction, an inner edge in the left and right direction between the respective plates 10 and 10b is abutted against the substrate 8 so that a three-dimensional strong fitting is realized.

In addition, of the back base portion terminal plates 11, 11a, an upper end portion of the upper terminal plate 11 is bent forward to form a forwardly bent plate 11b. An outer end in the left and right direction of the back base portion terminal plates 11, 11a are inclined toward an outer end in the left and right direction of the front connecting terminal 13 via bent portions 11c, 11d bent toward the front side. Base portion-side connecting terminal plates 11e, 11f having sideways faces parallel to an incorporating direction of the light source portion 7 are formed as will be described later, and one terminal 14a (FIG. 13) is connected to the base portion-side connecting terminal plates 11e, 11f so that an upper and lower pair of back light sources (light-emitting diodes are used in the present embodiment) 14 emit light outward in the left and right direction with a gap therebetween. These back light sources 14 are for irradiating light to an outer lateral side in the left and right direction and diagonally backward and are therefore legally required light sources for a side turn lamp. The other terminal 14b located forward of each back light source 14 provides fitting and electrical connection of the upper and lower back light sources 14 by being connected to a back outer connecting terminal plate 11g disposed in a manner flush with the base portion-side connecting terminal plates 11e, 11f. And, the back base portion terminal plates 11, 11a, the base portion-side connecting terminal plates 11e, 11f, the back light sources 14, and the back outer connecting terminal plate 11g are made into a rigid body by the connection (coupling), and moreover, the back terminal plates 11, 11a and the forwardly bent plate 11b are fixedly fitted by being caulked and soldered to the substrate 8, whereby against shaking in the left and right direction and in the front and back direction, an inner edge in the left and right direction between the respective plates 11, 11a and 11b is abutted against the substrate 8, so that a three-dimensional strong fitting is performed.

Electric or electronic elements 15 necessary for light emission control of the light sources 12 and 14 are disposed, in a condition connected to the substrate 8, in a space portion whose six front and back, left and right, and upper and lower sides are surrounded by the substrate 8, the front terminal plate 10, 10a, the backwardly bent plate 10b, the front connecting terminal plate 13, the back terminal plates 11, 11a, the forwardly bent plate 11b, the base portion-side connecting terminal plates 11e, 11f, and back outer connecting terminal plate 11g.

Moreover, with regard to the inner housing 6 as well, a front face portion 6a (FIGS. 7A-7D) and an outer lateral face portion 6b are made in a series form by an arc-shaped portion 6c, and a fitting portion X for fitting the light source portion 7 to the arc-shaped portion 6c in a manner facing forward is formed. For the fitting portion X, a front fitting portion 16 to which the front light sources 12 are fitted and a back fitting portion 17 to which the back light sources 14 are fitted are formed in in/out through window forms, respectively, while being sectioned into a front and back by a vertical frame 6e. Of these, the front fitting portion 16 is formed in the arc-shaped portion 6c on the side of the front face portion 6a. The front fitting portion 16 is formed in a manner sectioned into a top and bottom by a partition 16a fitted in a gap A formed between the upper and lower front light sources 12, and quadrangular-shaped bases 12c of the front light source 12 enter the sections individually. Furthermore, in the front fitting portion 16, formed at the vertical frame portion 6e, is a hitting face 16f where the front connecting terminal plate 13 is located in the back and hits thereagainst in surface contact while the front light sources 12 pass through forward when the light source portion 7 has been incorporated by insertion up to a predetermined set position (see FIG. 8 and FIG. 13). At a lower portion of the front fitting portion 16, formed in a protruding condition is a latching pawl 16c which is latched with the latching portion 10d formed on the backwardly bent plate 10b in a forcedly crossing condition for return prevention when the light source portion 7 has been incorporated by insertion up to the set position.

On the other hand, the back fitting portion 17 to which the back light sources 14 are fitted is formed at a part closer to the outer lateral face portion 6b in the arc-shaped portion 6c, and for the back fitting portion 17, an opening is formed in a manner sectioned into a top and bottom by a partition 17a fitted in a gap B formed between the upper and lower back light sources 14, and a guide face plate 17b on which inner lateral faces in the left and right direction of the base portion-side connecting terminal plates 11e, 11f and the back outer connecting terminal plate 11g formed in a flush manner move slidingly to guide incorporation of the light source 7 by insertion is formed. And, when the back light sources 14 have been incorporated up to the set position, the base portion-side connecting terminal plates 11e, 11f and the back outer connecting terminal plate 11g are in sliding contact with the guide face plate 17b so as to be located at the back side.

Furthermore, on an inner face of the front face portion 6a of the inner housing 6, a projection rib 6d to be fitted with a concave groove 4k formed on the base housing 4 is formed, and when the inner housing 6 is moved by sliding to the base housing 4, this reaches a condition where the substrate back edge 8c makes sliding contact with the front lateral face of the back lateral face portion 4g as described above, moves in the left and right direction, and assumes an incorporated posture where the power terminal 9 has passed through the through-hole 4i. And, by applying the lens portion 3 to the surface of the inner housing 6 incorporated in the base housing 4 as such, and by fixing peripheral portions hit against each other with the resin material 18 to each other, the side turn lamp 1 is formed.

Figure 12:
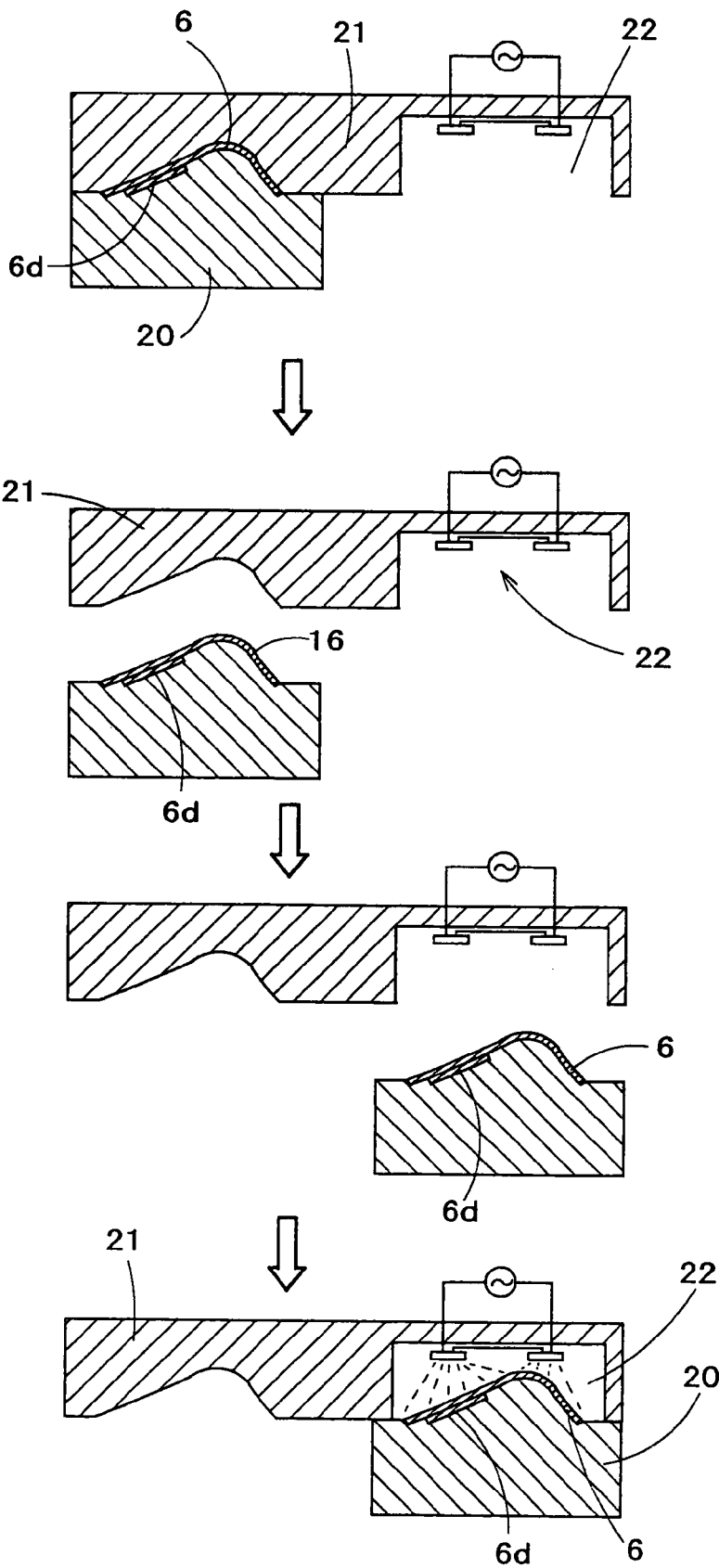
FIG. 12 is a schematic process drawing showing a molding and film formation step of the inner housing.
Figure 13:
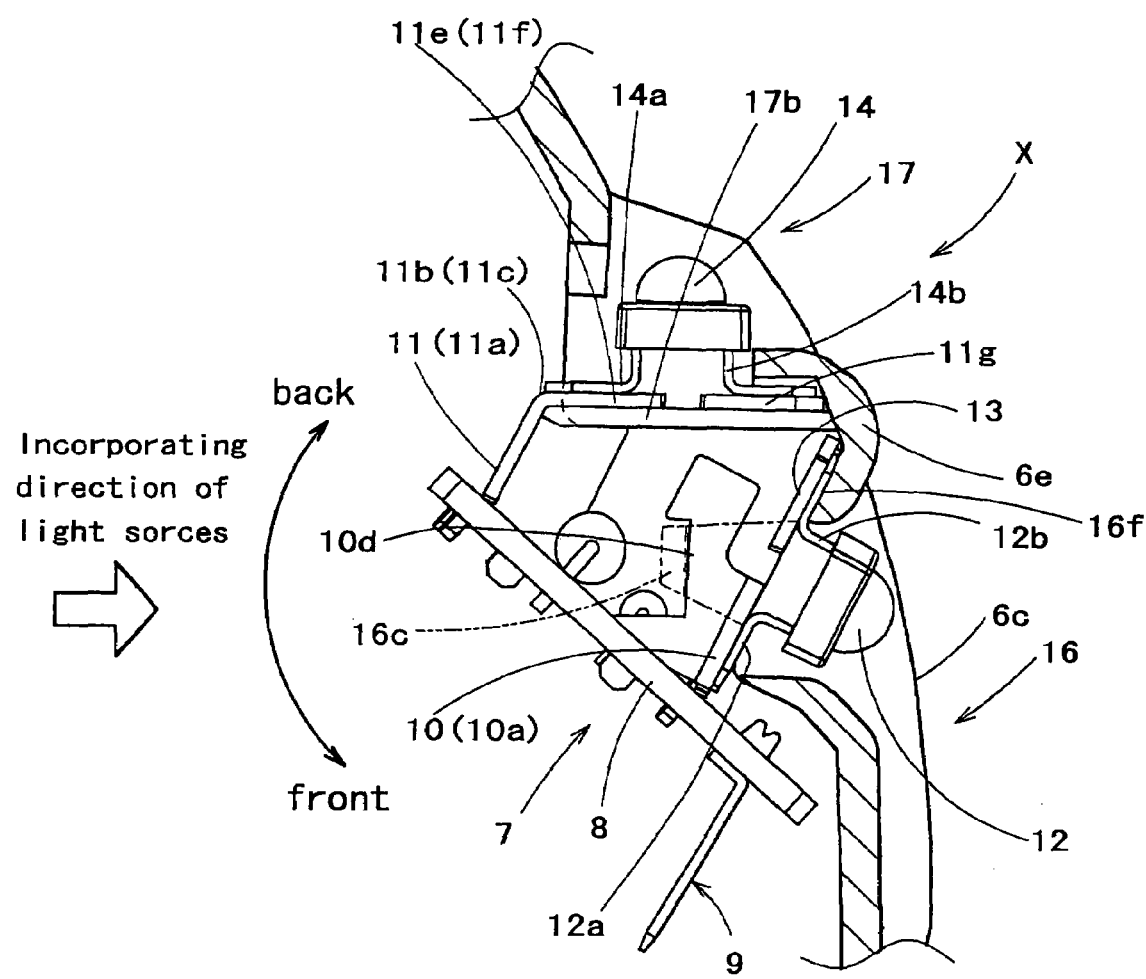
FIG. 13 is a partially enlarged sectional view showing a condition where the light source portion has been incorporated in the inner housing.

In this connection, the inner housing 6 can be manufactured by using a deposition and molding method for forming a reflecting surface 5 by performing molding using mating dies and then depositing a film on the surface of a molded article while holding the molded article in one die (see Japanese Published Examined Patent Application Nos. JP-B2-3677033 and JP-B2-3688289, for example). That is, as shown in FIG. 12, after matching a first die 20 and a second die 21 and performing injection molding of the inner housing 6, both dies 20 and 21 are opened with the inner housing 6 being held in the first die 20, and thereafter, by a relative displacement (movement of at least one of the dies), die-matching is performed so that a deposition system 22 provided at the second die 21 side and the inner housing 6 are opposed to each other and the reflecting surface 5 is deposited on the surface of the inner housing 6. The inner housing 6 thus applied with the reflecting surface 6 can be manufactured by a series of deposition and molding steps. And, in this case, the inner housing 6 is held in the first die 20 at the time of die-opening and an unexpected movement (floating, displacement, drop, etc.) with respect to the first die 20 is prevented by biting of the projection rib 6d into the first die 20. In this connection, such biting between the injection-molded article and die is not limited to forming a projection rib on the injection-molded article and can also be achieved by forming a concavity on the injection-molded article.

Moreover, the resin material 18 can be injected to fixedly fit the base housing 4 and the lens portion 3 so as to form the side turn lamp 1, and in this case, the side turn lamp 1 can be continuously manufactured by an injection molding method involving a die movement including midway, after respectively molding the base housing 4 and the lens portion 3 by a primary injection in a same die, an inserting step of inserting the inner housing 6 that has been deposited with a film and molded, and has been incorporated with the light source portion 7 in the base housing 4, butting the base housing 4 and the lens portion 3 against each other based on a relative displacement of the die, and then secondary-injecting the resin material 18 to the butting part for integration.

Then, the inner housing 6 with the light source portion 7 being incorporated therein (see FIGS. 8A and 8B) is to be incorporated in the base housing 4 (see FIG. 9), and in this case, when the inner housing 6 is moved by sliding in the protruding direction of the power terminal 9 with the projection rib 6d being fitted with the concave groove 4k, the back edge 8c of the substrate 8 is guided in sliding contact with the back lateral face portion 4g of the base housing-side light source housing portion 4h. When the inner housing 6 is further moved by sliding in this condition, the power terminal 9 passes through the through-hole 41 formed on the inner lateral face portion 4f of the inner housing-side light source housing portion 4h and is set by incorporation. In this set condition, an inner end (inner end of the front face portion 6a) 6f in the left and right direction of the inner housing 6 is abutted (or approximated) in a hit manner against an inner lateral end 4s in the left and right direction of a concave hole 4r formed on the base housing 4, while an outer end (outer end of the outer lateral face portion 6b) 6h in the left and right direction of the inner housing 6 is partially protruded (exposed) from the concave hole 4r, and the protruded part is provided as a tapered face 6g.

In this condition where the inner housing 6 has been incorporated in the base housing 4, the lens portion 3 is to be further fitted to the base housing in a hitting condition (FIGS. 10A and 10B), the inner housing tapered face 6g protruded from the concave hole 4r is to be abutted against a tapered face 3f formed on the lens portion 3 and is thus matched to the inclination, in which condition the inner housing arc-shaped portion 6c is held by the lens portion arc-shaped portion 3c. These constructions allow positioning of the inner housing 6 with respect to the lens portion 3 and the base housing 4.

In the embodiment of the present invention constructed as described, the side turn lamp 1 is constructed by integrating the lens portion 3 and the base housing 4 incorporated with the light source portion 7 in a butting condition. The light source portion 7 is constructed with the front and back light sources 12 and 14 that irradiate in different directions. The light source portion 7 is formed with the front and back light sources 12 and 14 differentiated in the irradiating direction where a first terminal plate including the front terminal plates 10 and 10a and the front connecting terminal plate 13 provided so as to create a gap from each other in the front and back direction and a second terminal plate including the back terminal plates 11 and 11a, the base portion-side connecting terminal plate 11e and 11f, and the back outer connecting terminal plate 11g are provided on the single substrate 8. The electric/electronic components 15 are disposed between these terminal plates. In addition, the base portion-side connecting terminal plates 11e and 11f are bent with respect to the back terminal plates 11 and 11a that is constructed as one unit, and it is sufficient to fit the light source portion 7, so that the number of components is reduced, and fitting efficiency is also improved.

Moreover, therein, by forming the base portion-side connecting terminal plate 11e and 11f by bending the front-end part of the back terminal plates 11 and 11a toward the front terminal plates 10 and 10a and providing the back outer connecting terminal plate 11g in a flush manner with the terminal plates 11e and 11f, the space S enclosed by the substrate 8 and the respective terminal plates 10, 10a, 11, 11a, 11e, 11f, and 11g is formed, and the electric or electronic components 15 are disposed in the space S. Therefore, the space to dispose these components 15 can be efficiently secured, and the components 15 can be protected.

Still moreover, the substrate 8 is provided with the power terminal 9 that is disposed on the inner lateral face 8a opposite the side to implant terminal plates and is connected to an external plug in a manner protruded outside through the base housing 4, all lead wires for the side turn lamp 1 are made unnecessary, which also allows a reduction in the number of components, and the side turn lamp 1 equipped with all necessary wires is provided by only incorporating the inner housing 6 incorporated with the light source portion 7 in the base housing 4 and molding, so that fitting efficiency is improved.

What is claimed is:

1. A vehicle lamp comprising:
   a lens portion; and
   a base housing incorporated with a light source portion, the base housing integrated with the lens portion in a butting condition, the light source portion comprises:
      first and second light sources,
      a substrate,
      a first light source terminal plate and a second light source terminal plate implanted in the substrate so as to create a cavity between the first light source terminal plate and the second light source terminal plate, and
      an electric or electronic component that turns on the first and second light sources, wherein
      a front-end part of at least one of the light source terminal plates is bent toward the other light source terminal plate so as to differentiate the first and second light sources in an irradiating direction.

2. The vehicle lamp according to claim 1, wherein:
   a space enclosed by the substrate and the first and second light source terminal plates is formed by bending the front-end part of the at least one light source terminal plate toward the other light source terminal plate, and the electric or electronic component is disposed in the space.

3. The vehicle lamp according to claim 2, wherein the substrate is provided with a power terminal that is disposed on a side opposite a side to implant the light source terminal plates and protrudes outside through the base housing.

4. The vehicle lamp according to claim 3, wherein the vehicle lamp is a side turn lamp provided on a door mirror of a vehicle.

5. The vehicle lamp according to claim 2, wherein the vehicle lamp is a side turn lamp provided on a door mirror of a vehicle.

6. The vehicle lamp according to claim 1, wherein the substrate is provided with a power terminal that is disposed on a side opposite a side to implant the light source terminal plates and protrudes outside through the base housing.

7. The vehicle lamp according to claim 6, wherein the vehicle lamp is a side turn lamp provided on a door mirror of a vehicle.

8. The vehicle lamp according to claim 1, wherein the vehicle lamp is a side turn lamp provided on a door mirror of a vehicle.

9. The vehicle lamp according to claim 1, wherein the first light source terminal plate includes a pair of front terminal plates and a connecting terminal plate that creates a gap between the pair of front terminal plates.

10. The vehicle lamp according to claim 1, wherein the second light source terminal plate includes a pair of back terminal plates and a connecting terminal plate that creates a gap between the pair of back terminal plates.

11. The vehicle lamp according to claim 1, wherein the first light source terminal plate includes a pair of front terminal plates and a bent plate that are fitted against the substrate.

12. The vehicle lamp according to claim 1, wherein the second light source terminal plate includes a pair of back terminal plates and a bent plate that are fitted against the substrate.

13. The vehicle lamp according to claim 1, wherein the first and second light sources are located at end parts of the first light source terminal plate and the second light terminal plate, and that the end parts are located adjacent to each other.

14. A light source portion comprising:
    first and second light sources,
    a substrate,
    a first light source terminal plate and a second light source terminal plate implanted in the substrate so as to create a cavity between the first light source terminal plate and the second light source terminal plate, and
    an electric or electronic component that turns on the first and second light sources, wherein
    a front-end part of at least one of the light source terminal plates is bent toward the other light source terminal plate so as to differentiate the first and second light sources in an irradiating direction.

15. The light source portion according to claim 14, wherein:
    a space enclosed by the substrate and the first and second light source terminal plates is formed by bending the front-end part of the at least one light source terminal plate toward the other light source terminal plate, and
    the electric or electronic component is disposed in the space.

16. The light source portion according to claim 14, wherein the substrate is provided with a power terminal that is disposed on a side opposite a side to implant the light source terminal plates.

17. The light source portion according to claim 14, wherein the first light source terminal plate includes a pair of front terminal plates and a connecting terminal plate that creates a gap between the pair of front terminal plates.

18. The light source portion according to claim 14, wherein the second light source terminal plate includes a pair of back terminal plates and a connecting terminal plate that creates a gap between the pair of back terminal plates.

19. The light source portion according to claim 14, wherein the first light source terminal plate includes a pair of front terminal plates and a bent plate that are fitted against the substrate.

20. The light source portion according to claim 14, wherein the second light source terminal plate includes a pair of back terminal plates and a bent plate that are fitted against the substrate.

21. The light source portion according to claim 14, wherein the light source portion is provided in a side turn lamp provided on a door mirror of a vehicle.

22. The light source portion according to claim 14, wherein the first and second light sources are located at end parts of the first light source terminal plate and the second light terminal plate, and that the end parts are located adjacent to each other.

* * * * *